United States Patent [19]
Wathen

[11] 3,848,914
[45] Nov. 19, 1974

[54] MOTOR SHIFTABLE SHOCK ABSORBING BUMPER

[75] Inventor: Robert Lucian Wathen, Greenvale, N.Y.

[73] Assignee: Sperry Rand Corporation, New York, N.Y.

[22] Filed: Oct. 19, 1973

[21] Appl. No.: 389,612

Related U.S. Application Data

[63] Continuation of Ser. No. 208,328, Dec. 15, 1971, abandoned.

[52] U.S. Cl. ............... 293/9, 180/82 R, 180/91, 246/30, 246/167 D, 250/215, 293/1, 293/84, 293/87, 307/106, 325/105, 343/7 ED
[51] Int. Cl. .... B60r 19/06, B61f 19/04, H01j 39/12
[58] Field of Search .............. 180/82 R, 91, 92, 98; 246/29, 30, 167 D; 250/215; 293/1, 9, 84, 87; 307/106, 246; 325/105, 321; 343/6.5 R, 7 ED, 13 R

[56] References Cited
UNITED STATES PATENTS

| | | | |
|---|---|---|---|
| 2,185,936 | 1/1940 | Yamada | 180/92 |
| 2,207,666 | 7/1940 | Hirabayashi | 180/92 |
| 2,804,160 | 8/1957 | Rashid | 246/30 X |
| 2,831,182 | 4/1958 | Kamins | 246/30 X |
| 2,896,089 | 7/1959 | Wesch | 250/215 |
| 3,134,619 | 5/1964 | Harrison, Jr. | 293/9 |
| 3,210,726 | 10/1965 | Copsy | 246/30 X |
| 3,355,208 | 11/1967 | Brock | 293/9 |
| 3,365,572 | 1/1968 | Strauss | 246/167 D |
| 3,402,370 | 9/1968 | Ross | 307/106 X |
| 3,659,203 | 4/1972 | Ross et al. | 307/246 X |
| 3,735,398 | 5/1973 | Ross | 180/98 |
| 3,750,025 | 7/1973 | Ross | 325/321 |
| 3,760,414 | 9/1973 | Nicolson | 343/6.5 R |
| 3,772,690 | 11/1973 | Nations | 343/7 ED |
| 3,772,697 | 11/1973 | Ross | 343/13 R |
| 3,789,948 | 2/1974 | Hrebicek | 293/87 X |

Primary Examiner—M. Henson Wood, Jr.
Assistant Examiner—Howard Beltran
Attorney, Agent, or Firm—Howard P. Terry

[57] ABSTRACT

A vehicular safety system including manual or automatic sensor armed bumper extension and retraction apparatus employs high pressure hydraulic or explosion actuator means for dissipating the kinetic energy of a protected vehicle during a collision with another object, reducing damage to the protected vehicle and the risk of injury to its passengers or cargo. Collision forced retraction of a bumper at one end of the vehicle either arms or aids in maintaining the armed or extended state of the bumper at the opposite end of the vehicle.

13 Claims, 11 Drawing Figures

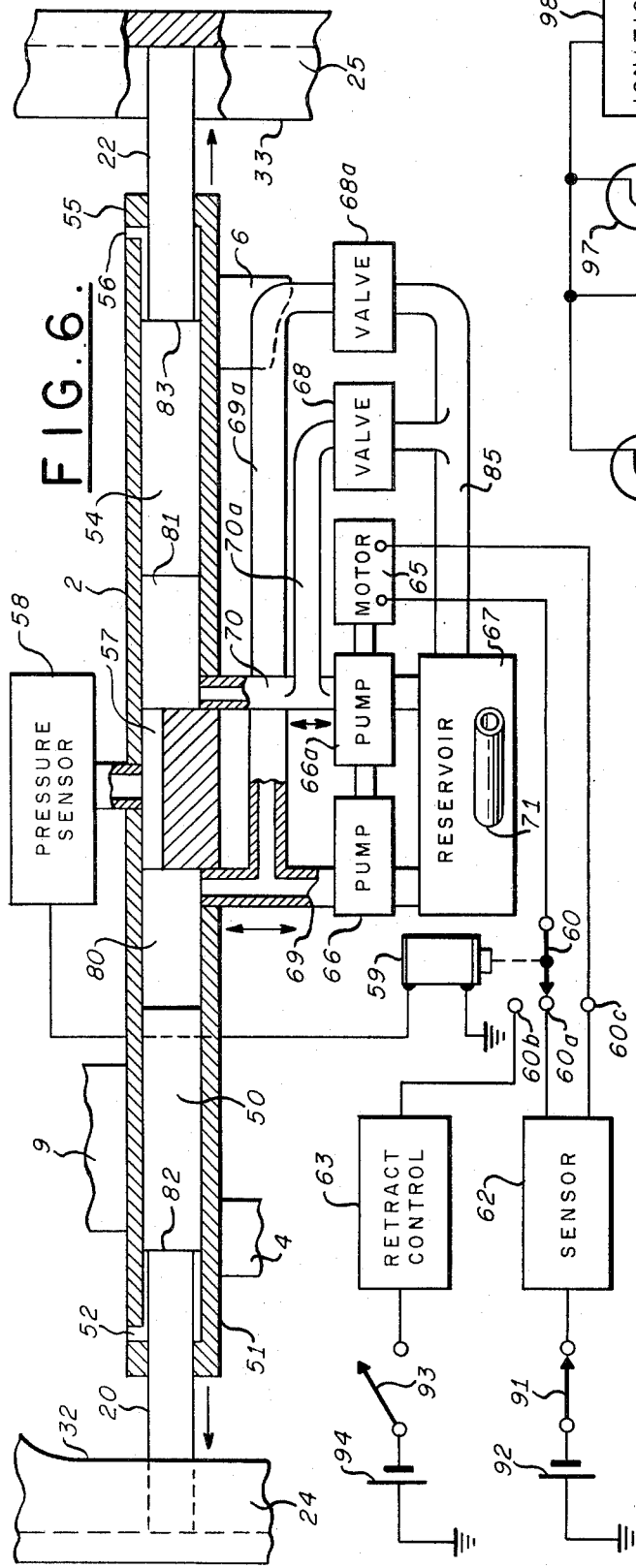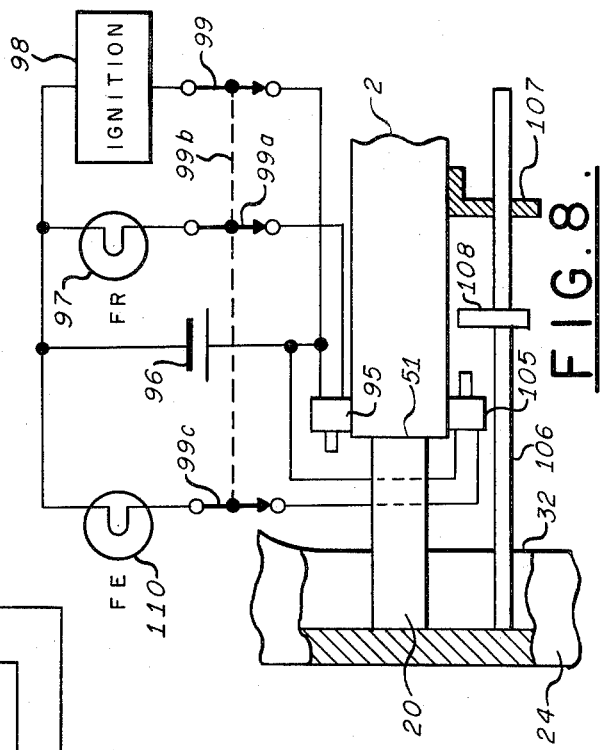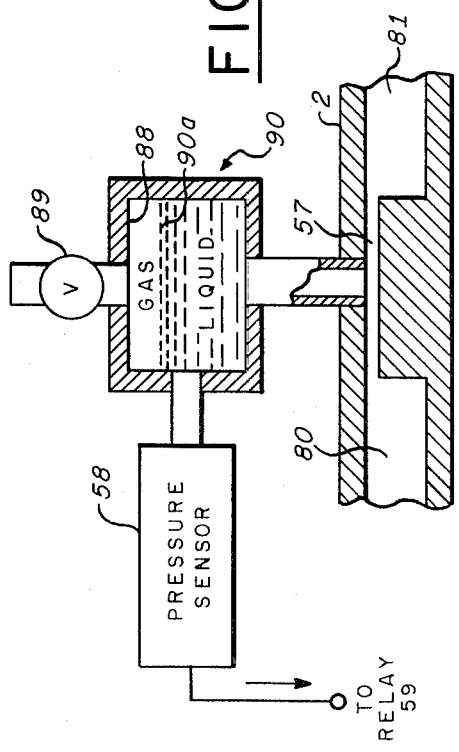

MOTOR SHIFTABLE SHOCK ABSORBING BUMPER

"This is a continuation of the U.S. Pat. application Ser. No. 208,328, filed Dec. 15, 1971 in the name of Robert L. Wathen for 'Vehicular Safety Apparatus,' assigned to the Sperry Rand Corporation, and now to be abandoned."

BACKGROUND OF THE INVENTION

1. Field of the Invention

The invention pertains to apparatus for the protection of a vehicle and its passengers or cargo and more particularly relates to manual or sensor controlled vehicle bumper extension and retraction apparatus providing means for reducing collision impact damage to the vehicle and injury to its passengers or cargo.

2. Description of the Prior Art

Early in the history of the gasoline automobile, the front and rear ends of these vehicles were equipped with flexible bumper systems which reliably absorbed energy at least in minor impacts with other similarly equipped vehicles. Speeds were low and crowding was rare so that such collision events seldom happened and so that they normally caused only minor damage. More recently, the growing increase of speed and carelessness, multiplication of cars, and the progressive trend toward attention to non-utilitarian design features of the automobile have increased the number and severity of automobile accidents, causing interest to arise among careful drivers in measures for the protection of automobile passengers and cargo and the vehicle itself.

Some have sought in the recent past to protect the driver and the passenger against himself; i.e., to protect the person who will not fasten a reliable seat belt or shoulder harness on one or another ground. One such prior art concept for passenger protection is the air or gas bag, a device actuated by a crude mechanical sensor in the form of a decelerometer-like device which, in theory, operates only after the collision impact occurs; i.e., these devices are not capable of anticipating the crash event. For example, one such mechanical sensor device includes a mass which is biased in an inactive position against a stop by plural spring contact members. During an actual collision, the mass is designed to move, overcoming the spring bias and activating a safety device such as driver or passenger restraining gas bags. Because such sensors lack the capability of anticipating a crash event, they are actuated, where they do perform reliably, always after the driver's or passenger's body has started to move toward the vehicle dash board; i.e., the driver or passenger is struck by the gas bag moving toward him relatively faster than the dash board of the vehicle. Whether or not inflation of the gas bag is inadvertent, the driver may lose all control of the vehicle.

In this and in similar prior art mechanical sensors which have been proposed for safety device actuation, the apparatus is presumed to be always in condition to operate satisfactorily, while in fact it may have remained in a dormant untended, and untested condition for months or even years. Fail-safe and operability monitoring instrumentalities are not present, and more important, are generally incapable of application to such devices, since such decelerometer devices are designed as strictly one-shot mechanical devices and do not readily accommodate themselves by nature to testing. While these prior art deceleration sensing devices are theoretically devised to be actuated at a particular impact level, there is little hope that they can demonstrate accurately repeatable and reliable characteristics in actual practice.

Inadvertent or delayed deployment or failure to deploy of the gas bag device can be disastrous. In addition to extreme noise levels within the car or truck cab, there is no protection offered in the case of multiple collisions, roll-overs, and the like. The seat belt and even the shoulder harness are still needed in serious collisions if the driver or passenger is to avoid sliding under or to one side of the inflated gas bag. It is clear that the gas bag alone is not a solution to the problem.

SUMMARY OF THE INVENTION

The invention is a safety sensor system for automotive and other vehicles, the novel apparatus being adaptable either to manual or automatic operation for the extension or retraction of protective bumpers at the front and rear ends of a protected vehicle. With the bumpers extended, the apparatus provides means for dissipating major portions of the kinetic energy of the protected vehicle should a collision occur with a second vehicle or other object, thus reducing damage to the protected vehicle and the risk of injury to its passengers or cargo. The bumpers may be extended by a manually operated control or by the additional or alternative action of a radio presence sensor, specially adapted to sense an impending collision. High pressure sources, including explosive actuator devices, may be employed for arming the system and extending one or both bumpers under control of the collision sensor. Collision forced retraction of a bumper at one end of the vehicle may be used to arm or to aid in maintaining the armed or extended state of the bumper at the opposite end of the protected vehicle. Extension may also be made automatic above an arbitrary low vehicle speed. A memory device then maintains the armed state of the bumpers even in the event of a panic effort by the operator to stop which locks the vehicle brakes, sliding its wheels. The retracted or extended state of the bumpers is conspicuously displayed to the vehicle operator, whose control over the vehicle is never hanpered by the prevailing state of the system.

BRIEF DESCRIPTION OF THE DRAWINGS

FIG. 6 is a plan view, partially in cross section, of a portion of FIG. 5 illustrating a radio control system according to the invention.

FIG. 7 is a cross section view of an alternative form of a portion of FIG. 6.

FIG. 8 is a cross section plan view of a part of FIG. 6 showing an electrical display for indicating the state of the system.

DESCRIPTION OF THE PREFERRED EMBODIMENTS

The radio sensor employed in the novel vehicle safety apparatus includes radio means for the detection of an impending collision immediately prior to contact of the protected vehicle with another object and for consequent actuation of novel safety devices for protecting the vehicle and its occupants when the crash event actually occurs. For example, base band radio pulse transmission and reception devices with first and second echo signal range gating channels may be used to provide distinctive output signals at first and second close-range distances between the vehicle and the reflecting object, which signals, when present simultaneously with an absolute forward vehicle speed signal of appropriate value, cause actuation of the novel protective device. Base band object sensor devices adaptable for use in the invention are described by G. F. Ross in the U.S. Pat. application Ser. No. 134,990 for a "Base Band Pulse Object Sensor," filed Apr. 19, 1971, now U.S. Pat. No. 3,772,697, issued Nov. 13, 1973, and in the G. F. Ross U.S. Pat. application Ser. No. 137,355 for "Energy Amplifying Selector Gate for Base Band Signals," filed Apr. 26, 1971, now U.S. Pat. No. 3,750,025, issued July 31, 1973. Applications of such base band detector apparatus in vehicular safety or protective devices are taught by G. F. Ross in the U.S. Pat. application 145,154 for "Base Band Short Range Pre-Collision Sensor for Actuation of Vehicle Safety Apparatus," filed May 20, 1971, issued May 22, 1973, and now U.S. Pat. No. 3,735,398, and by A. M. Nicolson in the U.S. Pat. application Ser. No. 191,675 for "Vehicle Safety Apparatus," filed Oct. 22, 1971, now U.S. Pat. No. 3,760,414 issued Sept. 18, 1973. While such base band systems have particular advantages for use in vehicular safety equipment, certain other types of radio sensors may also be used, such as the arrangement of the C. T. Nations U.S. Pat. application Ser. No. 205,592 for "Vehicular Safety Apparatus," filed Dec. 7, 1971 now U.S. Pat. No. 2,772,690; issued Nov. 13, 1973. The several above-mentioned patent applications are assigned to the Sperry Rand Corporation.

Figure 1:
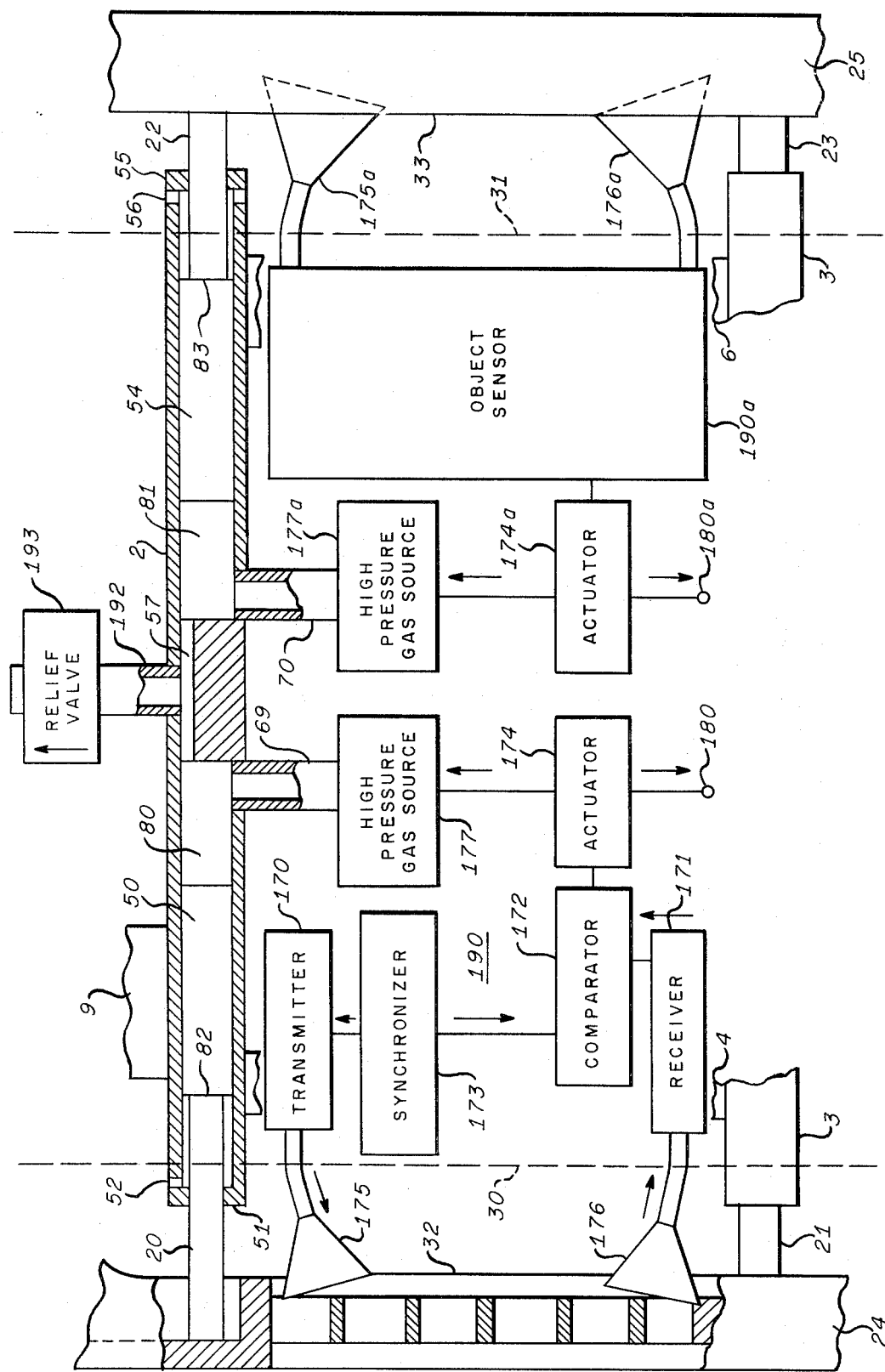
FIG. 1 is a plan view, partly in cross-section, showing vehicle safety equipment with a radio controlled protective system according to the invention.

In FIG. 1, impending collisions with vehicles or other objects are detected by a radio system of the aforementioned type, for example including a base band pulse transmitter 170 and a cooperating echo reception and detector system 171 of the type adapted for using subnanosecond duration pulses of electromagnetic energy. A conventional transmitter antenna 175 may be located at the left side of the protected car behind a dielectric grille at the front (or rear) or the car, with a radiation pattern directed in a generally forward manner toward any obstacle to forward motion of the protected car that might be present. A receiver antenna 176 is similarly mounted at the right side of the car behind the dielectric grille, being directed so that its receptivity pattern collects signals reflected from any near-range obstacle. Antennas 175 and 176 preferably have respective radiation and receptivity patterns sufficiently wide for echo energy to be collected generally from the rear or other part of an obstacle such as a second car.

The transmitter system utilizes the short base band transmitter or pulse generator 170 and a conventional directive radiator antenna 175, the transmitter pulse generator 170 being connected to radiator antenna 175 through a conventional interconnecting transmission line system. Generator 170 may be of the well known self-synchronizing kind and may be of a generally conventional type used in base bond radio systems of the aforementioned kind for producing single positive or negative going pulses or regular or other trains of pulses, each such pulse having a very short duration, and for radiating such pulses from a suitable antenna 175.

One device for producing such short base band pulses is disclosed by G. F. Ross in the U.S. Pat. No. 3,402,370 for a "Pulse Generator," issued Nov. 30, 1965; another is described by G. F. Ross and D. Lamensdorf in the U.S. Pat. application Ser. No. 46,079 for a "Balanced Radiation System," filed June 15, 1970, now U.S. Pat. No. 3,659,203 issued Apr. 25, 1972, and assigned to the Sperry Rand Corporation.

The radiated base band signal propagates in free space toward a reflecting target such as the rear of a forwardly located car and is reflected by the target surface to return toward receiver antenna 176. The echo wave return is delayed with respect to the transmitted wave by a time which is proportional to twice the distance or range to the reflecting target. The receiver antenna 176 may have properties generally similar to those of the transmitter antenna 175 in that it also employs an electrically smooth, constant impedance transmission line system for propagating TEM mode electromagnetic waves so that collected echo signals of very short duration propagate into the receiver antenna 176 with substantially no distortion. The device is supplied with a distance or range measuring device 172 which may take the form of a conventional range gating device or comparator circuit under the control of the system synchronizer 173. For example, in the arrangement of the abovementioned Ross Pat. No. 3,735,398, the radio sensor comprising transmitter 170 and receiver 171 employs base band duration electromagnetic pulse transmission and reception devices with range gating arrangements adapted to sense relative speeds of the vehicles involved in the potential crash. These signals, along with a signal representing the absolute speed of the protected vehicle, are employed when simultaneously present to activate passenger protective devices in anticipation of the actual collision event. Near range values and range rate may be employed so as to produce at comparator 172 an electrical output for operating a safety system actuator 174. It will be understood that the actuating signal supplied to actuator 174 represents a certain indication that an inevitable collision is about to occur between the protected car and a forwardly located vehicle or other object.

Radio distance sensors of the continuous wave type may also be employed, such as those of the kind described in the above-mentioned Nations patent application Ser. No. 205,592. The Nations radio pre-collision sensor employs directive radio transmission and reception of amplitude modulated energy to detect the forward located obstacle, measuring the range of the obstacle by employment of cross-over detection of the phase lag of the detected modulation with respect to the phase of a reference signal. Reception of signals having a wide dynamic amplitude range is accomplished, permitting accurate operation of the crossover detector device. Range and range rate signals are then generated and are compared in a device such as comparator 172 for actuating a device such as the motor 65 of FIG. 6, or the conventional high pressure gas source 177 of FIG. 1, as will be explained.

The actuator 174 of FIG. 1 may be connected to operate a conventional electrical motor 65 and one or more conventional hydraulic pumps 66, 66a, as indicated in FIG. 6 or, as in FIG. 1, may be connected to a conventional source 177 of high pressure gas that is released when device 177 receives a command from actuator 174, as will be discussed. The frontal radio sensor system, it is seen, will thus provide operation of the conventional actuator 174 when the chance of a collision has reach a predetermined high probability, rapidly releasing gas from high pressure gas source 177 for flow through pipe 69 into cylinder chamber 80. Piston 50 is then forced outward, causing the desired extension of bumper 24, as will be further discussed relative to FIGS. 5. It will be understood that the same actuator 174 may supply an output on electrical lead 180 for operation of a high pressure source similar to source 177 for operation of the ram 21 at the opposite side of the protected vehicle. Alternatively, pipe 69 may directly supply the output of source 177 through a branching pipe for operation of ram 21. While the duplicate arrangements for both sides of the vehicle are not shown in detail, this is merely for the sake of simplifying the drawing, as it will be clear to those skilled in the art that such duplicate systems are entirely feasible and as is further illustrated in FIG. 5.

It will also be apparent that the rear of the protected vehicle may also be protected in part by the extension of the rear bumper in a chain collision by leakage of gas through conventional constriction 57 into chamber 81 when the gas in source 177 is released. The rear of the vehicle may be independently or additionally protected through the use of a duplicate radio sensor 190a having rearwardly directed transmitter and receiver antennas 175a, 176a for detecting an impending collision at the rear of the protected vehicle. When such an event is detected, the duplicate sensor 190a causes actuator 174a to release gas from high pressure source 177a into chamber 81, positively and quickly extending rear bumper 25 for the full travel of rams 22, 23. The conventional relief valve 193 coupled to pipe 192 brancing from constriction 57 may be set to release at a high pressure preferably greater than that produced by the operation of sources 177, 177a, a pressure such as may be realized, for example, when both of the extended bumpers 24, 25 are impacted in relatively rapid sequence, as in a chain reaction accident.

Figure 2:
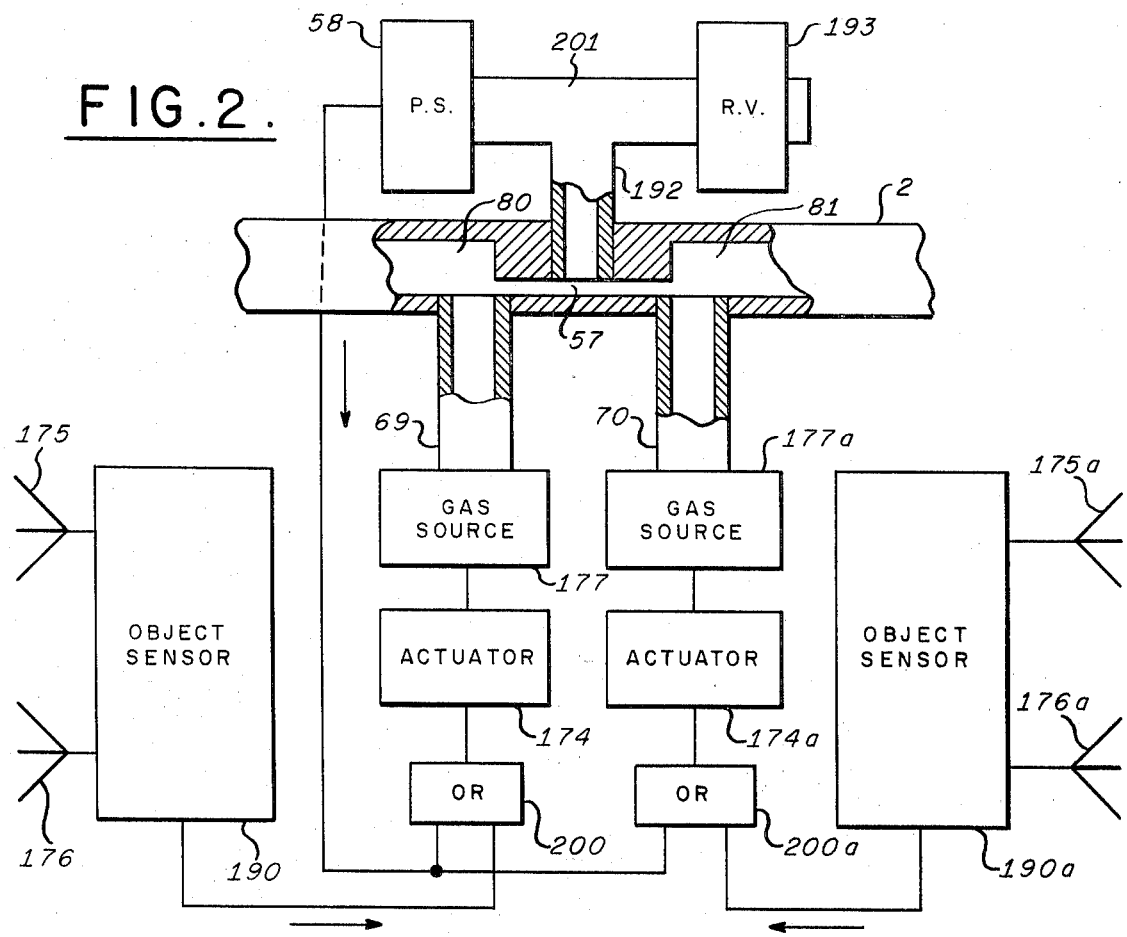
FIG. 2 is an alternative form of a portion of the safety system of FIG. 1.

Further failure-proof arrangements are readily envisioned according to the present invention; the embodiment of FIG. 2 also illustrates other features of versatility of the present invention. In FIG. 2, parts that are common to the apparatus of FIG. 1 bear similar reference numerals. As in FIG. 1, FIG. 2 shows the use of respective forward and rearward radio pre-collision object sensors 190 and 190a for automatic extension of the respective bumpers 24, 25. The respective electrical signal outputs of radio sensors 190, 190a may be supplied through conventional OR circuits 200, 200a to the respective actuators 174, 174a. A signal from the conventional hydraulic pressure sensor 58 is also coupled to OR circuits 200, 200a, pressure sensor 58 being coupled to a pipe 201 branching from pipe 192. In the event of an impending frontal collision, object sensor 190 operates actuator 174, extending the front bumper 24. If the collision is violent and pressure in pipes 192, 201 rises sufficiently high, an electrical signal from pressure sensor 58 flows through OR circuit 200a, automatically operating actuator 174a and extending the rear bumper 25. Such operation occurs even if no closely following vehicle is present or, as a fail-safe feature, even if radio object pre-collision detector 190a is defective. Conversely, in the event of an impending rear end collision, object sensor 190a operates actuator 174a, extending the rear bumper 25. If the collision is violent, pressure in pipes 192, 201 again rising above a predetermined value, an electrical signal from pressure sensor 58 flows through OR circuit 200, automatically operating actuator 174 and extending the front bumper 24. Again, such operation occurs even if no object is too close to the front of the protected vehicle. The operation also occurs, as a fail-safe feature, when radio object detector 190 is for any reason disabled.

A variety of known devices may be used to perform the functions of the respective actuators 174, 174a and gas sources 177, 177a. Generally, these devices are of classes of devices well known in the art as sources of large amounts of gas under high pressures. They include high pressure storage tanks which may store gas in its liquid form for rapid conversion to expanding gas when a relatively large valve is suddenly opened. Also, electrically ignited explosive materials contained in similar high pressure vessels are available.

Figure 3:
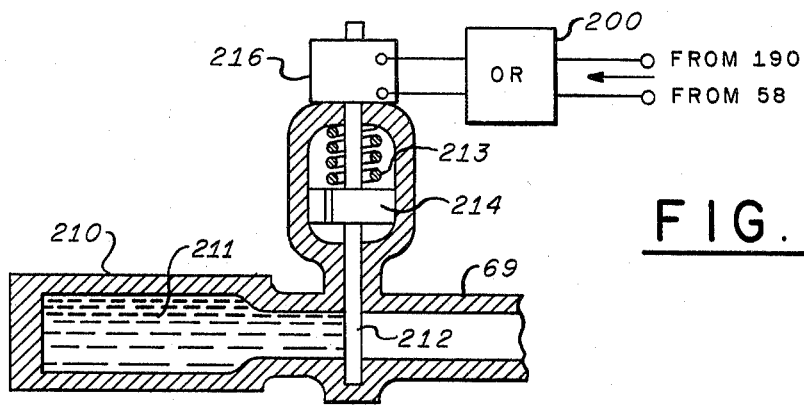
FIGS. 3 and 4 show high pressure gas generators for use in the arrangements of FIGS. 1 and 2.

For example, FIG. 3 illustrates a conventional pressure vessel 210 containing a volatile liquid 211 under high pressure, which liquid 211 may be rapidly released as a gas into pipe 69 of FIG. 2 by the rapid opening of a conventional gate or other valve 212. Gate 212 is, for example, normally held closed by the force of spring 213 against guide 214, but may be opened when the conventional electrical relay solenoid 216 is excited by an electrical signal from signal sources 58 or 190 flowing through the OR circuit 200 of FIG. 2. Realy solenoid 216 may be of the conventional latching type so that, when valve 212 is opened, it remains open until reset.

In lieu of a mechanical valve, gate 212 may be formed of a prior art permanent plastic or other seal which may be ruptured by an exploding element encased within it or mounted next to it and electrically exploded by the electrical output of OR circuit 200. While air, nitrogen, carbon dioxide, or other gases relatively harmless to human beings and non-inflammable may be employed, the spent gases are not exhausted into the vehicle interior when relief valve 193 opens, so that there is relative freedom of choice of a suitable gas.

Alternatively, the sources 177, 177a of high pressure gas may be provided by use of an electrically explosive element 250 supported by mount 251 within high pressure vessel 210. The explosive 250 is ignited by an electrical signal from OR circuit 200 placed on a preferably shielded igniter lead or leads 252 sealed through the end wall 256 of vessel 210. Explosive element 250 may be of the known type in which the resistance of a wire to the flow of an electrical current through it rapidly produces sufficient heat to ignite a known chemical ignition mixture which, in turn, fires a conventional primer charge, thereby exploding a relatively larger base charge for producing gas in copious quantities again for supply to the system via pipe 69 of FIG. 1 or 2.

Figure 5:
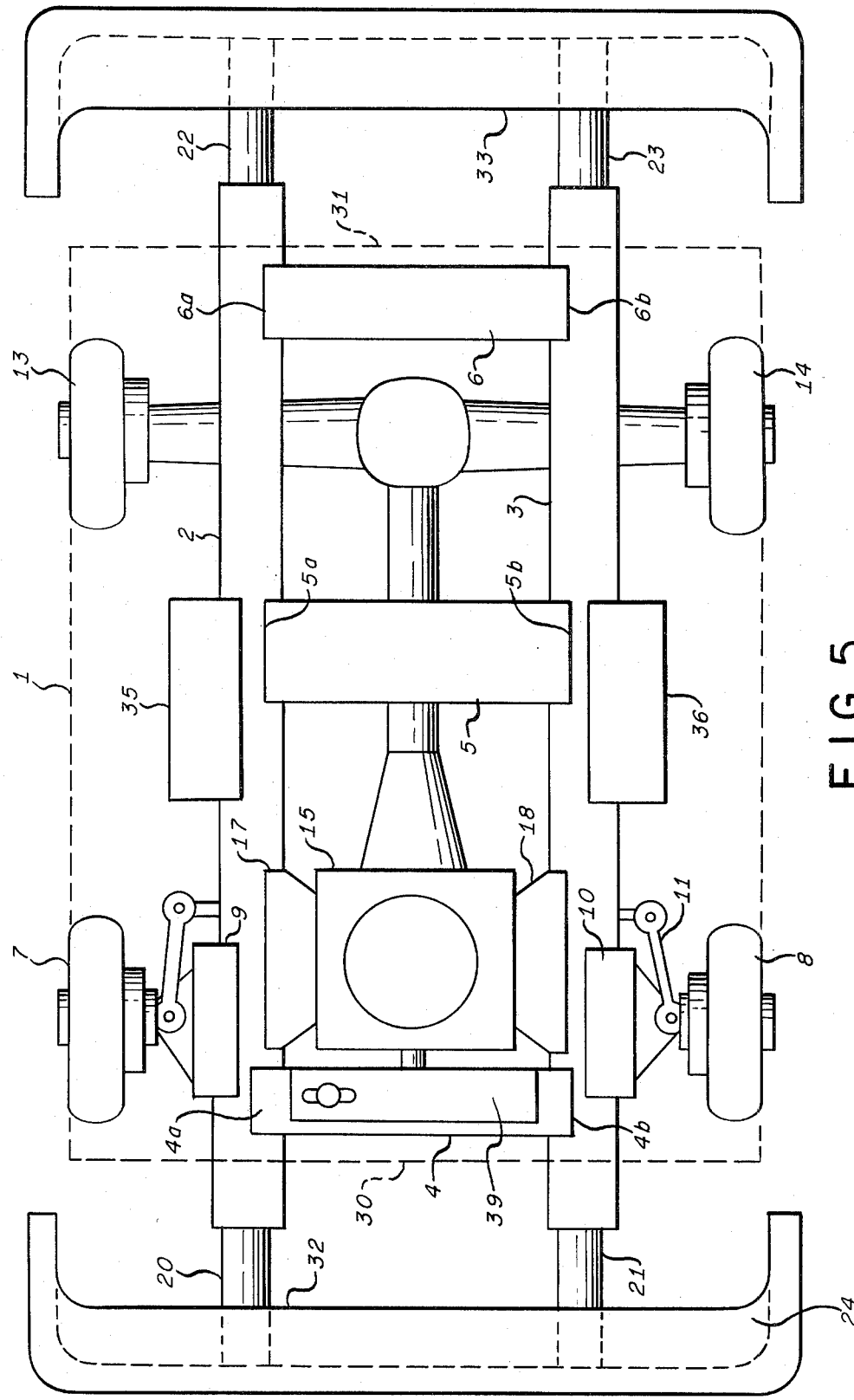
FIG. 5 is a plan view of the chassis of a vehicle employing the invention.

It will be understood by those skilled in the art that the configurations of FIGS. 1 and 2 may be an accessory in which the longitudinal tubular elements 2 and 3 may be welded or otherwise rigidly attached to a conventional vehicle frame. On the other hand, the apparatus may itself supply at least portions of the frame of the vehicle, the longitudinal tubular elements 2 and 3 forming in themselves the vehicle longitudinal frame elements, as seen in FIG. 5. In FIG. 5, the vehicle is equipped with a rigid frame adapted for supporting as well as protecting the vehicle body 1 (indicated by dotted lines) and the vehicle passengers or cargo from injury or damage due to collisions with other vehicles or other objects. The principal parts of the frame consist of the pair of longitudinal tubular elements 2 and 3 to which are welded cross members such as the strengthening cross member elements 4, 5, and 6. Tubular elements 2, 3 may be of circular, elliptical, square, or of other cross section. Cross member 4 at the front of the vehicle is welded or otherwise fastened to the exterior surface of tubes 2 and 3 respectively at locations 4a and 4b. The central cross member 5 is welded or otherwise fastened at 5a and 5b to the respective tubes 2 and 3, while the rear cross member 6 is similarly affixed atllocations 6a and 6b. Additional similar cross members or cross bracings having an X configuration may be employed, as will be evident to those skilled in the art.

Conventional front wheels 7 and 8, steered by steering mechanism 11, are supported from wheel support structures 9 and 10 generally of the conventional type, the supports being welded or otherwise fastened to the respective tubes 2 and 3. Rear drive wheels 13 and 14 are conventionally sprung below the respective frame tubes 2 and 3 and are driven in the conventional manner by the vehicle motor 15; motor 15 may be supported by conventional motor mounts 17 and 18 also affixed to the respective tubes 2 and 3.

It will be understood that the vehicle frame and especially tubes 2 and 3 of the frame as shown in the FIG. 5 embodiment serve the usual function of elements used in vehicle frames. However, frame tubes 2 and 3 also support hydraulically positioned shaft elements, such as the conventional shaft or ram elements 20 and 21 that support a relatively massive front bumper 24 and shafts or rams 22 and 23 that support the relatively massive rear bumper 25. Bumper 24, for example, is supported so that it may be moved forward relative to the front 30 of vehicle body 1; as shown in the drawing, front bumper 24 is extended, for example, about half of its possible degree os extension so that a notable gap is found between body front 30 and the back surface 32 of bumper 24. The shafts or rams 20 and 21 are extended or retracted by operation of the conventional hydraulic actuators found in the interior of the forward portions of tubes 2 and 3.

In a similar manner, tubes 2 and 3 support hydraulically positionable shaft elements, such as the shaft or ram elements 22 and 23 that support the relatively massive rear bumper 25. As shown, the rear bumper 25 is extended for example, about half of its permitted degree of extension so that a notable gap is found between the body rear edge 31 and the front surface 33 of rear bumper 25. The shafts or rams 22 and 23 may similarly be extended or retracted by operation of conventional hydraulic actuators found in the interior of the rearward portions of tubes 2 and 3. Individual control devices 35 and 36 for operating the respective hydraulic actuators may be attached directly to tubes 2 and 3 or may be placed at other convenient locations on or in the vehicle.

It will be understood that bumpers 24 and 25 may be contoured so as to perform their protective function with highest efficiency. They may also act, while still retaining complete effectiveness, as major frontal or rearward portions of the vehicle body. For example, the front bumper 24 may effectively comprise a major part of the front of the vehicle, being equipped with openings sufficient for the passage of cooling air through radiator 39 and over motor 15 and serving also as a support for road lights or the like. The rear bumper 25 may be similarly fashioned.

As is also generally shown in FIG. 1, the front bumper ram shaft 20 is supported in FIG. 5 in the interior of tube 2 by a conventional piston 50 free to move longitudinally within the interior of tube 2. Shaft 20 moves through an end gland 51, an air vent hole 52 being provided for the ingress and exit of air surrounding the part of shaft 20 within the front end of tube 2. In a similar manner, the rear bumper ram shaft 22 is supported in the interior of tube 2 by a conventional piston 54, again free to move longitudinally within the interior of tube 2. Shaft 22 moves through an end gland 55, and an air vent 56 similar in operation to vent 52 is provided.

In the central portion of tube 2, the constricted passage 57 is provided for connecting the opposite interiors of tube 2; a conventional pressure sensor 58 is coupled, for convenience, substantially at constriction 57 for measuring the pressure of hydraulic fluid in the interior of tube 2 between pistons 50 and 54. Hydraulic pressure pick-off or sensor 58 supplies an electrical output for operating a conventional electrical relay 59 that controls the position of switch 60 in the further embodiments of the invention. Switch 60 contacts terminal 60a for relatively low pressures sensed at sensor 58, but is caused by relay 59 to contact terminal 60b when a predetermined higher pressure is reached. Terminal 60a is connected to receive the electrical output of a sensor 62, causing bumpers 24, 25 to be extended. Terminal 60b is connected to receive the output of control device 63 which is adapted to cause bumpers 24, 25 to be retracted by manual or other commands.

Hydraulic liquid reservoir 67 is adapted to supply or to receive fluid depending upon the sense in which the conventional pumps 66, 66a are driven by electrical motor 65, the fluid passing in or out of chambers 80, 81 through their associated branching pipes 69, 70 and pumps 66, 66a. The conventional reservoir 67 is equipped with a conventional standpipe 71 for permitting air to flow with respect to the interior of reservoir 67; standpipe 71 also may serve for replenishing fluid within reservoir 67. Conventional one-way relief valves 68, 68a, poled as indicated, are also connected between pipes 69, 70 and the pipe 85 and reservoir 67.

In operation of the embodiment of FIG. 6, bumpers 24, 25 may be fully retracted. A signal generated by sensor 62, which may occur at a suitable time after the vehicle motor 15 is started, for example, may be used to cause the conventional motor 65 and pumps 66, 66a to withdraw hydraulic fluid from reservoir 67 and to force it through pipes 69, 70 into the respective piston chambers 80, 81. As the fluid pressure in chambers 80 and 81 increase, pistons 50 and 54 are driven outward and bumpers 24, 25 are extended. At full extension, the respective outer faces 82, 83 of pistons 50, 54 impact glands 51, 55 and motion of the pistons 50, 54 stops.

When bumpers 24, 25 are thus fully extended, the fluid pressure in piston chambers 80, 81 builds up abruptly. The consequent large electrical output of pressure sensor 58 operates relay 59, moving switch 60 to terminal 60b, stopping motor 65 whenever the system is in a mode of operation such that there is no voltage on contacts 60b. Bumpers 24, 25 are held in place, since fluid may not flow back through the stationary pump 66. Should the pressure sensed by sensor 53 now fall significantly, switch 60 will be returned to terminal 60a, and motor 65 will operate pumps 66, 66a until the condition is remedied.

Normally, whenever the protected vehicle is subject to the possibility of collision in using the embodiment of FIG. 6, bumpers 24 and 25 are therefore in their extended states. For illustrative purposes, consider the succession of events when, in close traffic, the protected vehicle collides with a vehicle in front of it. Bumper 24 and piston 50 are moved back from their extended positions and the liquid in piston chamber 80 is forced through pipe 69 and the branching pipe 69a, then through the one-way high pressure relief or check valve 68a back into reservoir 67. Relief valve 68 may be provided with a constriction, or a suitable constriction may appear, for instance, in the input pipe 69a associated with valve 68a. At the same time, the pressure rise due to the frontal collision is bled through the constriction 57 between chambers 80 and 81, thus maintaining pressure in the second chamber 81 and consequently holding rear bumper 25 fully extended throughout the frontal collision.

In many chain collisions, a collision of a following vehicle occurs immediately after the protected vehicle has struck the vehicle that it itself was following. Should the rear of the protected vehicle now be struck in this manner, events similar to those previously described occur. Rear bumper 25 and piston 54 are moved inwardly, forcing hydraulic liquid out of chamber 8 through pipe 70, through branching pipe 70a and through relief valve 68a into reservoir 67. Valve 68a will also preferably be provided with a suitable construction. In this manner, the energy of the colliding, cooperatively equipped vehicles is transferred in good measure into heat, minimizing damage to the vehicles and decreasing the risk of injury to passengers.

The response characteristics of the system to the sharp forces prevailing in a collision event may be selected to be linear or nonlinear. For example, such response characteristics may be altered as seen in FIG. 3 by interposing a tank or conventional accumulator 90 between chambers 80, 81 and the pressure sensor 58. Tank 90 is adapted to hold a volume of gas against its upper interior surface 88 which is compressible when exposed to rapidly increasing pressure due to entry of hydraulic fluid into tank 90 via constriction 57. The amount of gas permanently captured in tank 90 may be adjusted by use of a conventional replenishing valve 89. It will be appreciated by those skilled in the art that similar elements may be substituted for tank or accumulator 90, and that such devices may be located at other points in the hydraulic system of FIG. 6. It will also be appreciated, for example, that tank 90 may be replaced with a conventional kind of accumulator having a flexible diaphragm sealed to the interior surface of tank 90 and located at interface 90a for providing positive separation of the gas and liquid. It will be understood with regard to FIGS. 5 to 7, as well as in the instances of the figures previously discussed, that the dimensions shown are not necessarily to scale and that dimensional ratios are chosen with a view of making the drawings clear. Accordingly, dimensional relations are not necessarily those which would be used in actual practice of the invention, as will be apparent to those skilled in the art.

It has been seen that the vehicle, according to the FIG. 6 embodiment, has progressed through its operation from starting and running and perhaps even contact with other vehicles at its front or rear. In any event, sensor 62, once activated, has continued to provide a command for the extension of bumpers 24 and 25. At the end of a trip, or in a parallel parking maneuver, it may be desired to retract bumpers 24, 25. Such is readily accomplished, for example, by opening switch 91 in FIG. 6 so that voltage supply 92 is no longer available to sensor 62. As a consequence, relay 59 will move switch 60 to terminal 60b. The vehicle operator may then activate retract control 63 by closing switch 93. Motor 65 will then operate to withdraw fluid from chambers 80, 81 into reservoir 67, retracting bumpers 24 and 25. It will be understood by those skilled in the art that sensor 62 and retract control 63 may be removed from the circuit and that their respective functions may fully be exercised by the respective switches 91 and 93. It will be further understood that the systems of FIGS. 1 and 2 may operate entirely separately of the auxiliary concepts of FIG. 6, or that the concepts may be used cooperatively according to the invention.

FIG. 8 illustrates representative circuits for alerting the vehicle operator as to the extended or withdrawn state of, for example, the front bumper 24. In FIG. 8, a switch 95, when made conducting due to operating contact with a surface of bumper 24 when the latter is fully retracted, is affixed near front gland end 51 to tube 2. Switch 95 is connected in series circuit with battery 96, indicator or lamp 97, and switch 99a. Switch 99a is shown in its conducting position where it may be placed by manual link 99b when the vehicle ingition switch 99 is closed to operate engine ignition 98. Thus, when the vehicle ignition switch 99 is turned on and bumper 24 is in the retracted state, lamp 97 is lighted and may illuminate appropriate symbols such as the letters FR (front retracted) making them visible to the vehicle operator.

In FIG. 8, the status indicating system may utilize a second switch 105 mounted on tube 2 at its front 51. Switch 105 is made conducting when operated by a plate 108 that may be moved back and forth with bumper 24 because it is mounted on rod 106. Rod 106 is affixed at one end to bumper 24 and is free to slide through a hole in bracket 107 mounted on tube 2 near the opposite end of rod 106. Switch 105, when made conducting due to contact with plate 108 when bumper 24 is fully extended, is connected in series circuit with battery 96, indicator or lamp 110, and switch 99c. Switch 99c, like switch 99a, is shown in its conducting position where it is placed by manual link 99b when the vehicle ingition switch 99 is closed to operate the conventional ignition system 98. Thus, when the vehicle ignition switch 99 is turned on and bumper 24 is in its fully extended state, lamp 110 illuminates symbols such as the letters FE (front extended) visible to the operator. Distinctive colors may also be used for lamps 97, 110 in the well known manner. It will be clear to those skilled in the art that a similar status display may be used to indicate the extended or retracted state of rear bumper 25, or may be adapted for use in the embodiments of FIGS. 1 and 2.

Figure 4:
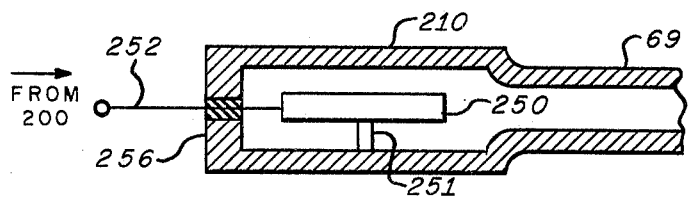
Figure 9:
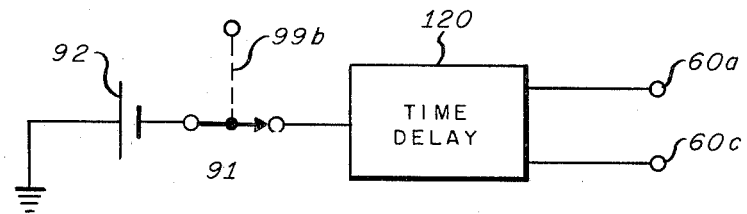
FIG. 9 is an alternative control circuit for use in FIG. 6.

Sensor 62 of FIG. 6 may take any of several forms; in the form of FIG. 9, which 91 is, for example, closed by operation of mechanical link 99b when the ignition switch 99 of FIG. 4 is closed, thus closing switch 91 in series with battery 92. The manual command generated by the closure of switch 91 is applied to a conventional time delay circuit 120. After a suitable time delay required for the vehicle to start freely moving forward, a command appears on terminals 60a, 60c for the bumpers 24, 25 to be extended. They may be withdrawn after ignition switch 99 is opened and the vehicle motor 15 is stopped by closure of switch 93 for a predetermined time interval. Clearly, an appropriate mechanical linkage between switches 99 and 93 will also produce automatic retraction. It may be preferred that bumpers 24, 25 always be extended; in this case, no retract signal is ever applied to motor 65 and the circuit attached to switch contact 60b is not needed.

Figure 10:
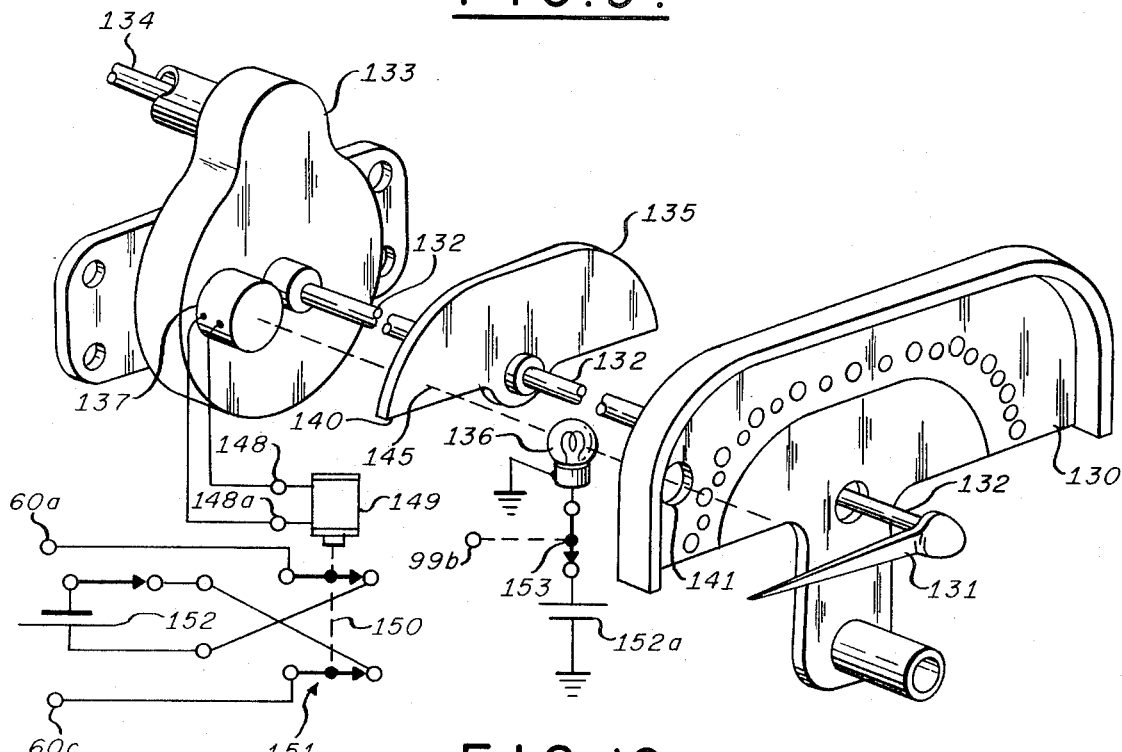
FIG. 10 is an exploded view of a vehicle speedometer having means for supplying a speed voltage to the control circuit of FIG. 6.

Alternatively, it may be preferred that bumpers 24, 25 be extended and remain extended only when the protected vehicle has gained a predetermined low forward speed; in this case, the functions of the sensor 62 and retract control 63 of FIG. 6 may be performed by the apparatus of FIG. 10. The speed sensor system may take any of the several forms of known devices capable of providing a zero output below a predetermined absolute vehicle speed and a finite output above that predetermined absolute speed. In the example shown in FIG. 10, the speed sensor cooperates with a conventional vehicle speedometer having a calibrated dial 130 with a pointer 131 mounted on an end of a spindle 132. It will be understood that the speedometer includes within casing 133 the usual driving permanent magnet and torqued speed cup and that spindle 132 is affixed to the speed cup for rotation thereby. It will further be understood that the speedometer drive cable 134 is geared to the drive shaft of the vehicle in the conventional manner such as to rotate the permanent magnet within casing 133 and thus induce a clockwise rotation of spindle 132 and pointer 131 to a position indicative of vehicle forward speed, the rotation of the speed cup and of spindle 132 being against the action of a spring within casing 133 which tends to return pointer 131 to its zero position.

A cam-shaped half disc 135 is secured to spindle 132 between casing 133 and dial 130 for rotation with spindle 132. The periphery of cam 135 passes between light source 136 and photocell 137, cutting optical path 145. Cam 135 is located on spindle 132 so that the edge 140 of the cam moves with pointer 131 in substantially the same angular relation as pointer 131. Light source 136 may be supplied with power from the vehicle battery 152a, for example, when the radio pre-collision object detector itself is activated, as by operating the engine ignition switch or switch 153 and may be viewed by the vehicle operator through an aperture 141 in dial 130. The output of photocell 137 may be applied directly or after suitable amplification to terminals 60a, 60c of FIG. 8. In FIG. 10, it is shown that the output of photocell 137 may be used to operate a conventional electrical relay 149 via terminals 148, 148a which places the conventional reversing switch 151 by virtue of mechanical link 150 in one of two possible positions with respect to the poles of battery 152. Thus, a command is applied to terminals 60a, 60c either to extend or to retract bumpers 24, 25. From FIG. 10, it is seen that for low vehicle forward speeds, cam 135 intercepts the optical path 145 between light source 136 and photocell 137, and there is no signal input at terminals 148, 148a. On the other hand, as pointer 131 progresses above a predetermined absolute speed indication, such as a very few miles per hour, the edge 140 of cam 135 moves with it out of optical path 145 and photocell 137 then supplies a signal of arbitrary amplitude to terminals 148, 148a. It will be understood that there are other types of signal sources for generating the desired absolute speed term; for example, cam 135 can readily be employed as an element of a conventional capacity pick-off bridge circuit designed to produce oscillations and to provide a finite rectified signal to terminals 148, 148a above the predetermined forward speed and to fail to oscillate, thus yielding no output, below the same predetermined forward speed.

Figure 11:
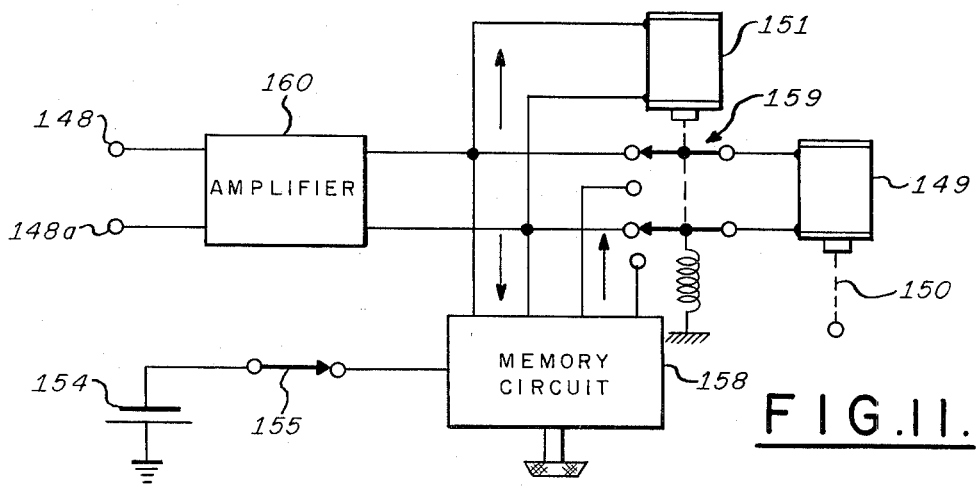
FIG. 11 is an alternative circuit which may be used in the speed sensor system of FIG. 10.

The apparatus of FIG. 11 may be used to ensure operation of the novel protective system using the vehicle speed pick off device of FIG. 10 in certain circumstances. It will be generally desired that the protective system respond quickly when extension of bumpers 24, 25 is required, but quick response to what amounts to a retract command may not necessarily be desired. For example, in a panic stop situation, one or all vehicle brakes may lock and slide their associated wheels to the extent that the vehicle drive shaft is substantially stalled and there is accordingly no significant input on shaft 134, of FIG. 10. For at least a part of the interval of the skid, there may undesirably be insufficient output voltage at terminals 148, 148a of FIG. 10; the normal response of relay 149 will be to order the bumpers 24, 25 to be retracted.

The circuit of FIG. 11 provides a continuing control signal for electrical relay 149 during such a skid event. In FIG. 11, the output of photocell 157 on terminals 148, 148a is amplified by the conventional amplifier 160, if required, and is then coupled to three branching lead pairs. One lead pair supplies the output of amplifier 160 to the conventional electrical relay 151, causing it to hold the blades of switch 159 in such a position that there is also a direct path for the output of amplifier 160 to the relay 149 of FIG. 10. A third electrical lead pair applies the output of amplifier 160 to a conventional memory circuit 158, activated by battery 154 when switch 155 is closed. Circuit 158 may be any type of generally known analog memory circuit, for example, of the type which stores a signal in a capacitor, regenerating it at least in part for use should its input fail. The output of memory 158 may therefore continue to be a substantial replica of the output of amplifier 160 when a skid begins. Should the voltage on terminals 148, 148a and therfore the output of amplifier 160 drop sufficiently toward zero, relay 151 permits the blades of switch 159 to drop, connecting the output of memory circuit 158 to hold relay 149 in the same condition as it held prior to initiation of the skid. Memory circuit 158 may have a time constant related to the anticipated skid period, so that relay 149 is eventually permitted to operate after a desired delay. In any event, as soon as a voltage again appears on terminals 148, 148a, relay 151 moves switch 159 so that relay 149 is again directly operated by the output of photocell pick off 137.

Accordingly, it is seen that the invention is a system for the protection of the passengers or cargo of a vehicle and of the vehicle itself, employing means which may be reliably actuated in anticipation of a crash between a protected vehicle and a similar vehicle or other object. The apparatus of the invention is always in condition to operate satisfactorily, fail-safe operability monitoring instrumentalities assuring ready deployment of the apparatus when needed. Conventional seat belts or other accepted passenger restraining equipment may also be used and vehicle occupants are not subjected to the disabling effects of suddenly inflated gas bags and the dangerous noise level of suddenly inflated gas bags and the dangerous noise level associated with their actuation. Furthermore, the vehicle operator may more successfully retain control over the vehicle at all times.

While the invention has been described in its preferred embodiments, it is to be understood that the words which have been used are words of description rather than of limitation and that changes within the purview of the appended claims may be made without departure from the true scope and spirit of the invention in its broader aspects.

I claim:

1. A radio pre-collision protective system for a vehicle having first and second ends, comprising:
   directive radio object detector means at said first end characterized by the generation of a control signal instantaneously prior to collision of an object with said first end of said vehicle,
   high pressure fluid generator means instantaneously responsive to said control signal, and
   actuator means for supporting bumper means at said first end and responsive to activation of said high pressure fluid generator means for extending said bumper means prior to said collision.

2. Apparatus as described in claim 1 further including:
   Second actuator means for supporting second extendable bumper means at said second end of said vehicle,
   constricted fluid conduit means for retarding interchange of pressurized fluid from said actuator means at said one end and said second actuator means for causing at least partial extension of said second extendable bumper means and for the dissipation of collision energy as heat when said bumper means at said first end is impacted in a collision with an obstacle.

3. Apparatus as described in claim 2 further including:
   second directive radio object detector means at said second end characterized by the generation of a control signal instantaneously prior to collision of a second object with said second end of said vehicle, and
   second high pressure fluid generator means instantaneously responsive to said second directive radio object detection means control signal,
   said second actuator means being responsive to activation of said second high pressure fluid generator means for extending said second extendable bumper means.

4. Apparatus as described in claim 2 including pressure sensor means responsive to a predetermined fluid pressure level within said first or second actuator means for causing said respective second or first actuator means fully to extend said respective second or first bumper means.

5. A protective system for a vehicle having first and second ends comprising:
   sensor means responsive to motion of said vehicle for deriving a measure of the speed of said vehicle,
   converter means for converting said measure of speed into a substantially constant finite electrical signal only above a predetermined finite value of said speed substantially greater than zero and only for forward motion of said vehicle,
   hydraulic pump means responsive to said converter means substantially constant finite electrical signal by operation only in a first direction, and
   actuator means responsive to said hydraulic pump means for extending extendable bumper means at said first end in the presence of said substantially constant finite electrical signal.

6. Apparatus as described in claim 5 additionally including switching means responsive to said converter means for providing an electrical signal opposite in polarity with respect to said substantially constant finite electrical signal for causing said hydraulic pump means to be operative in said second direction for retracting said extendable bumper means at said first end.

7. Apparatus as described in claim 5 further including sensor means responsive to said hydraulic pump means when operative in said one direction for detecting the substantially full extension of said extendable bumper means at said first end and for interrupting operation of said hydraulic pump means thereupon.

8. Apparatus as described in claim 5 additionally including memory means responsive to said converter means for delaying retraction of said extendable bumper means at said first end when said converter means output momentarily drops below the value of said predetermined substantially constant electrical signal.

9. Apparatus as described in claim 5 additionally including manually operable control means for causing said hydraulic pump means to be operative in a second direction for retracting said extendable bumper means at said first end.

10. Apparatus as described in claim 9 further comprising display means for indicating within said vehicle the extended or retracted state of said extendable bumper means at said first end.

11. Apparatus as described in claim 5, wherein said hydraulic pump means comprises reversible-motor driven fluid pump means for interchange of fluid between reservoir means and said actuator means.

12. Apparatus as described in claim 11 including constricted unilateral fluid by-pass means between said actuator means and said reservoir means for the purpose of dissipation of collision energy as heat when said bumper means at said first end is impacted in a collision with an object.

13. Apparatus as described in claim 11 further including:

second extendable bumper means at said second end, second actuator means responsive to said hydraulic pump means for extending said second extendable bumper means, and constricted fluid conduit means for retarding interchange of fluid between said actuator means at said one end and said second actuator means for the purpose of dissipation of collision energy as heat when either one of said extendable bumper means is impacted in a collision with an obstacle.

* * * * *